United States Patent
Kim (10) Patent No.: US 8,292,175 B2
(45) Date of Patent: Oct. 23, 2012

(54) TAG DEVICE, READER DEVICE, AND RFID SYSTEM

(75) Inventor: Nam Yun Kim, Ansan-si (KR)

(73) Assignee: LG Innotek Co., Ltd., Seoul (KR)

( * ) Notice: Subject to any disclaimer, the term of this patent is extended or adjusted under 35 U.S.C. 154(b) by 239 days.

(21) Appl. No.: 12/442,856

(22) PCT Filed: Jun. 9, 2008

(86) PCT No.: PCT/KR2008/003209
§ 371 (c)(1),
(2), (4) Date: Mar. 25, 2009

(87) PCT Pub. No.: WO2008/150147
PCT Pub. Date: Dec. 11, 2008

(65) Prior Publication Data
US 2010/0072277 A1    Mar. 25, 2010

(30) Foreign Application Priority Data

Jun. 8, 2007 (KR) .......... 10-2007-0056255
Jul. 16, 2007 (KR) .......... 10-2007-0071013

(51) Int. Cl.
*G06K 7/00* (2006.01)
(52) U.S. Cl. ............. 235/439; 340/572.1; 235/487; 235/492
(58) Field of Classification Search ........... 235/439, 235/487, 492; 340/572.1, 340.1; 257/79, 257/88, 324; 438/26, 34
See application file for complete search history.

(56) References Cited

U.S. PATENT DOCUMENTS

| 4,280,273 | A | | 7/1981 | Vincent |
| 5,499,124 | A | | 3/1996 | Vu et al. |
| 5,603,087 | A | * | 2/1997 | Shultz ............... 455/423 |
| 5,850,416 | A | | 12/1998 | Myer |
| 2002/0149482 | A1 | * | 10/2002 | Shanks et al. .......... 340/572.1 |
| 2006/0238308 | A1 | | 10/2006 | Mickle et al. |
| 2007/0007584 | A1 | | 1/2007 | Hwang et al. |
| 2007/0215881 | A1 | | 9/2007 | Yamamoto et al. |
| 2008/0179602 | A1 | | 7/2008 | Negley et al. |

FOREIGN PATENT DOCUMENTS

| JP | 07-030338 A | 1/1995 |
| KR | 10-1992-7000502 A | 2/1992 |

(Continued)

OTHER PUBLICATIONS

Analog Devices. (1998). A 0.1 to 2.5 GHz Logarithmic Amplifier for RF Detection. *Microwave Journal*, 41(7): 142-145.

(Continued)

*Primary Examiner* — Daniel Hess
*Assistant Examiner* — Tabitha Chedekel
(74) *Attorney, Agent, or Firm* — Saliwanchik, Lloyd & Eisenschenk (57) ABSTRACT

Embodiments relate to a tag device, a reader device, and a radio frequency identification (RFID) system. The Q embodiment provides a tag device comprising: a reception module converting a received high frequency signal into a scale level, and Q converting the converted scale level into a digital signal to output the same; a transmission module modulating a transmission signal M to output the same; and a controller controlling the reception module and the transmission module. The tag device communicates with the reader device through wireless short distance communication.

18 Claims, 4 Drawing Sheets

FOREIGN PATENT DOCUMENTS

| | | |
|---|---|---|
| KR | 10-2000-0074437 A | 12/2000 |
| KR | 10-2006-0132089 A | 12/2006 |
| KR | 10-0680501 B1 | 2/2007 |
| KR | 10-2007-0025926 A | 3/2007 |
| WO | WO-03/017320 A1 | 2/2003 |
| WO | WO-2006/059331 A2 | 6/2006 |

OTHER PUBLICATIONS

Supplementary European Search Report dated Sep. 19, 2011 in European Application No. 08766171.6, filed Sep. 6, 2008.

* cited by examiner

TAG DEVICE, READER DEVICE, AND RFID SYSTEM

CROSS-REFERENCE TO RELATED APPLICATION

This application is the U.S. national stage application of International Patent Application No. PCT/KR2008/003209, filed Jun. 9, 2008, the disclosure of which is hereby incorporated by reference in its entirety.

TECHNICAL FIELD

Embodiments relate to a tag device, a reader device, and a radio frequency identification (RFID) system.

BACKGROUND ART

Ubiquitous network technology means technology allowing a natural access to various networks without limitation in time and space. Examples of the ubiquitous network technology comprise RFID technology.

Generally, the RFID technology comprises a tag device and a reader device. The tag device is attached on an object such as goods to record detail information of the object. The reader device performs RF communication with the tag device to obtain the information of the object from the tag device. This RFID technology provides an infrastructure on which distribution/circulation management such as distribution, assembly, price change, and selling can be efficiently processed.

DISCLOSURE OF INVENTION

Technical Problem

Embodiments provide a tag device, a reader device, and an RFID system that can decode a received high frequency signal without using an intermediate frequency.

Embodiments provide a tag device that can efficiently use power by providing various modulation methods and operating in a passive mode modulation method or an active mode modulation method depending on the kind of power.

Embodiments provide a reader device and an RFID system that can separate transmission signals modulated in various methods into signals of the same phase and orthogonal signals to transmit the signals in the form of circularly polarized waves.

Embodiments provide a tag device and an RFID system that can stably recover received signals regardless of a phenomenon that the phase and the energy delivery position of a signal change depending on position movement.

Embodiments provide a tag device, a reader device, and an RFID system that can change a high frequency signal in a direct current (DC) level without using a related art demodulation method that uses a superheterodyne method, a sequential low frequency method, an intermediate frequency synthesis method.

Embodiments provide a reader device and an RFID system that can stably supply tag energy and improving a signal recognition rate by using various modulation methods and differently processing a signal with consideration of a reception angle.

Technical Solution

An embodiment provides a tag device comprising: a reception module converting a received high frequency signal into a scale level, and converting the converted scale level into a digital signal to output the same; a transmission module modulating a transmission signal to output the same; and a controller controlling the reception module and the transmission module.

An embodiment provides a reader device comprising: a reception module converting a received high frequency signal into a scale level, and outputting the converted scale level as a digital signal; a transmission module modulating an information request signal to output the same; and a controller controlling the reception module and the transmission module.

An embodiment provides a radio frequency identification system comprising: a tag device comprising: a first reception module converting a received high frequency signal into a scale level, and outputting the converted scale level reception signal as a digital signal; a first transmission module modulating an information request signal to output the same; and a first controller controlling the first reception module and the first transmission module; and a reader device comprising: a second reception module converting a high frequency signal received from the tag device into a scale level, and outputting the converted scale level reception signal as a digital signal; a second transmission module modulating an information request signal, and transmitting the signal to the tag device; and a second controller controlling the second reception module and the second transmission module.

The details of one or more embodiments are set forth in the accompanying drawings and the description below. Other features will be apparent from the description and drawings, and from the claims.

Advantageous Effects

Embodiments can decode a received high frequency signal without using an intermediate frequency (IF), low IF, zero IF to reduce the number of parts of a tag device and a reader device, and realize a simple circuit.

Embodiments can efficiently use power of a tag device.

Embodiments can provide various modulation methods to a tag device and/or a reader device to maintain stabile communication according to an electromagnetic wave environment.

Embodiments can improve the signal recognition rates of a tag device and a reader device, and improve reception sensitivity and a signal recognition distance.

Embodiments can modulate a transmission signal in various modulation methods, and transmit the transmission signal in a circularly polarized component in a reader device, and provide a reader device that can stably communicate with a tag device.

BEST MODE FOR CARRYING OUT THE INVENTION

Reference will now be made in detail to the embodiments of the present disclosure, examples of which are illustrated in the accompanying drawings.

Figure 1:
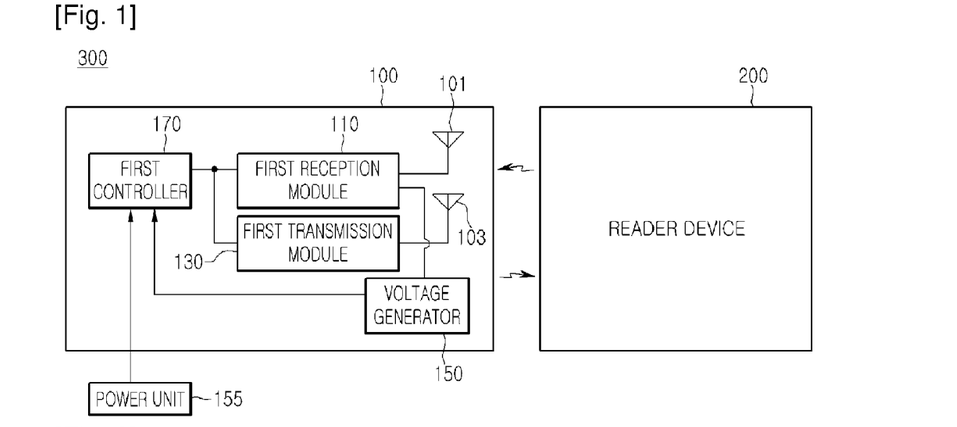
FIG. 1 is a construction view of an RFID system according to a first embodiment.
Figure 2:
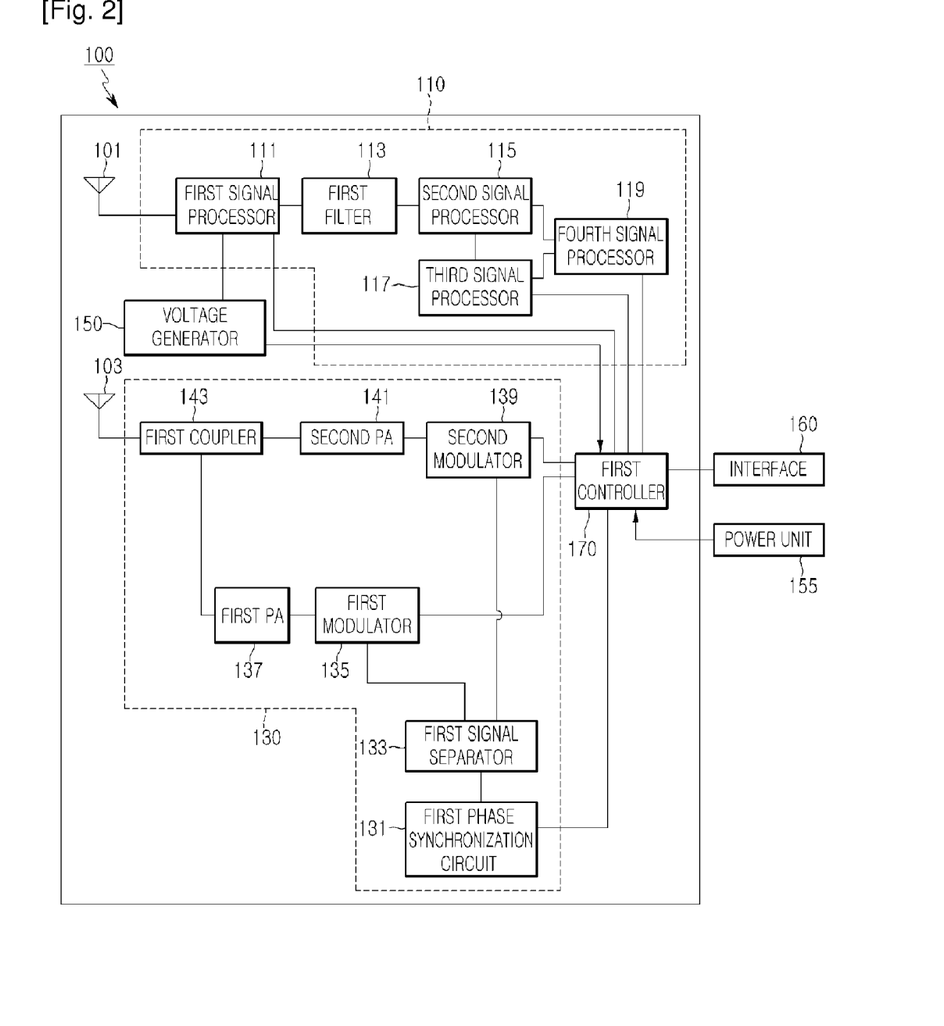
FIG. 2 is a construction view of the tag device of FIG. 1.

The first embodiment is illustrated in FIGS. 1 to 6. FIG. 1 is a construction view of an RFID system according to the first embodiment, and FIG. 2 is a construction view of the tag device of FIG. 1.

Referring to FIG. 1, the RFID system 300 comprises a tag (or transponder) device 100 and a reader (or interrogator) device 200.

The reader device 200 communicates with the tag device 100 through wireless short distance communication in order to collect information of the tag device 100. For example, the reader device 200 can collect the information of the tag device 100 by transmitting an information request signal to the tag device 100, and receiving object detailed information from the tag device 100. The reader device 200 transmits/receives the collected information to/from a middle ware or other nodes.

The tag device 100 has various shapes and sizes, and is classified into an active tag and a passive tag depending on whether power is supplied, classified into a low frequency system and a high frequency system depending on a frequency in use. The tag device 100 is attached to persons, automobiles, goods, livestock, and buildings, and contains detailed information of a corresponding object. Also, the tag device 100 can be mounted on a smart card to perform user authentication and electronic payment. The tag device 100 can be attached or function in cooperation with another device to provide various services.

The RF frequency tag of the RFID system 300 can be classified into a low frequency (LF) tag of 124-134 kHz used for access control and animal management, a high frequency (HF) tag of 13.56 MHz used for an integrated circuit (IC) card and an identification card, an ultra HF (UHF) tag of 400-915 MHz used for identification of containers in distribution and circulation, and a microwave tag of 2.45 GHz. Also, a 5.8 GHz tag can be used for telematics. These communication bands are provided for an exemplary purpose, and can change within the technical spirit and the scope of the embodiments.

Here, the tag device 100 can operate in an active mode driven by power supplied from a power unit 155, and a passive mode not requiring power. That is, the tag device 100 can operate in a semi-active mode. Here, when the tag device 100 is mounted on a terminal such as a mobile terminal, the tag device 100 can use the battery power of the mobile terminal as the power unit 155.

The tag device 100 comprises a first reception module 110, a first transmission module 130, a voltage generator 150, and a first controller 170. The first reception module 110 can decode high frequency signals received through a reception antenna 101, and the decoded signals are delivered to the first controller 170. Here, the first reception module 110 converts high frequency signals into digital signals using a log amplifier and a comparator. Since the first reception module 110 does not use general a superheterodyne method, a sequential low frequency method, an intermediate frequency synthesis method, the number of parts can be reduced and a circuit size can be minimized.

The controller 170 controls a drive in the active mode or a passive mode depending on whether power is supplied. For example, the tag device 100 is driven by the power unit 155 during the active mode, and driven by a voltage generated by the voltage generator 150 during the passive mode. Also, the active mode and the passive mode can be changed depending on whether power is supplied from the power unit 155, or can be switched from the passive mode to the active mode when power is supplied to the power unit 155. One of the active mode and the passive mode can be changed to the other according to a manipulation signal of an operator.

The voltage generator 150 receives a scale signal corresponding to a high frequency signal processed by the first reception module 110 to generate a voltage necessary for the tag device. The voltage generator 150 supplies a generated voltage to each part through a logic board or the first controller 170 of the tag device 100, so that the tag device 100 can operate in the passive mode.

The voltage generator 150 is a voltage oscillation circuit or a voltage multiplier circuit, and can be realized using a plurality of detection diodes and capacitors connected in multiple steps.

During the passive mode, the first transmission module 130 transmits a transmission signal through a transmission antenna 103 in a backscatter method.

Here, during the passive mode and the active mode, the first transmission module 130 can use different modulation methods. For example, the first transmission module 130 can use amplitude shift keying (ASK) during the passive mode, and can selectively use frequency shift keying (FSK), quadrature phase shift keying (QPSK), and phase shift keying (PSK) during the active mode.

FIG. 2 is a construction view of the tag device of FIG. 1.

Referring to FIG. 2, the tag device 100 comprises the first reception module 110, the first transmission module 130, and the voltage generator 150. The first reception module 110 comprises a first signal processor 111, a first filter 113, a second signal processor 115, a third signal processor 117, and a fourth signal processor 119.

The first to fourth signal processors 111, 115, 117, and 119 decode a high frequency signal into a digital signal.

The first signal processor 111 filters RF signals in a predetermined frequency band from RF signals received through an reception antenna 101, amplifies a gain of the RF signals, and processes the RF signals into DC level analog signals. For example, the first signal processor 111 can output the high frequency signals into baseband signals using a log amplifier, or the high frequency signals into baseband signals using an RF pin diode. Here, the log amplifier can be applied to a system requiring long distance communication and high sensitivity. The RF pin diode can be used for low price and short distance communication. An embodiment is described to use the log amplifier.

At this point, the first controller 170 outputs a control signal to the first signal processor 111, and the control signal controls the gain of the first signal processor 111.

The first filter 113 removes a noise component comprised in a signal processed by the first signal processor 111. The first filter 113 can be realized using passive elements such as a resistor and a capacitor, and removes a ripple of a signal output from the first signal processor 111. That is, when a ripple is not sufficiently removed from a reception signal, a difference is generated to the scale of a carrier signal by a direct decoding method. Therefore, the filter 113 removes the ripple of a reception signal. Here, the first signal processor 111 can rectify an RF signal into a DC to use the DC as a voltage generation source.

The second signal processor 115 controls the gain of the first filter 113 and amplifies a signal, and the amplified signal is input to the fourth signal processor 119.

The output of the third signal processor 117 changes depending on a reference voltage of the first controller 170, and the changed output is output to the fourth signal processor 119. Here, the second signal processor 115 controls a signal output from the first signal processor 111 using a signal fed back from the third signal processor 117. At this point, the amplification gain of the second signal processor 115 is compensated for according to various reference voltages of the first controller 170.

The fourth signal processor 119 compares an amplified signal of the second signal processor 115 with an output signal of the third signal processor 117 to output a digital signal as a result of the comparison. That is, the fourth signal processor 119 serves as an analog-to-digital converter. A digital signal of the fourth signal processor 119 changes depending on the output level of the third signal processor 117, and is input to the first controller 170.

The first controller 170 controls the gain of the first signal processor 111 depending on a received signal state, and controls the reference voltage of the third signal processor 117. Accordingly, the first controller 170 can control the sensitivity of a digital signal output to the fourth signal processor 119. Also, the first controller 170 delivers synchronization information to the fourth signal processor 119 to control a comparison operation.

The first controller 170 can store tag information. For example, the first controller 170 can comprise a memory (not shown), or the tag information can be separately stored. The first controller 170 has a communication protocol to control radio communication with the reader device 200, and provides tag information when an information request signal is received from the reader device 200. Also, the first controller 170 analyzes codes of signals decoded by the first to fourth signal processors 113, 115, 117, and 119, and generates transmission data.

The first transmission module 130 comprises a first phase synchronization circuit 131, a first signal separator 133, a first modulator 135, a first power amplifier 137, a second modulator 139, a second power amplifier 141, and a first coupler 143.

The first phase synchronization circuit 131 generates a reference signal under control of the first controller 170. The first signal separator 133 outputs the reference signal to the first modulator 135 and the second modulator 139. Here, the first signal separator 133 can be realized using a switch device such as a single pole double throw (SPDT) or a coupler, but is not limited thereto.

Here, the first controller 170 delivers a digital transmission signal to the first modulator 135 and/or the second modulator 139 of the first transmission module 130. At this point, when the first transmission module is in the passive mode, the first modulator 135 operates. When the first transmission module is in the active mode, the second modulator 139 operates.

Also, an interface 160 is connected to a mobile terminal, for example, to receive manipulation signals of the active mode and the passive mode and deliver the signals to the first controller 170. The first controller 170 can select the active mode or the passive mode depending on the manipulation signal. That is, during the passive mode, the first controller 170 can output a digital transmission signal to the first modulator 135, and during the active mode, the first controller 170 can output a digital transmission signal to the second modulator 139. Embodiments may not use the power unit 155 and the interface 160. Since the construction of the tag device may change depending on an installation environment or application service, the embodiments are not limited to using the power unit 155 and the interface 160.

Here, the voltage generator 150 receives an analog signal from the first signal processor 111 to multiply the signal in order to generate a voltage. The generated voltage is supplied to each part through the first controller 170 of the tag device 100. That is, a voltage for the passive mode is supplied. The voltage generator 150 can be realized using a voltage oscillation circuit or a voltage multiplier circuit, for example. The voltage generator 150 can comprise a plurality of detection diodes and capacitors connected in a multiple steps.

The power unit 155 can be realized in a battery and a voltage control circuit and supplies power to each part through the first controller 170. Here, through the powers of the voltage generator 150 and the power unit 155 have been described to be supplied through the first controller 170, this is only one example, the powers can be supplied through a logic board of the device.

The first modulator 135 modulates a digital transmission signal into a first analog signal using ASK. The first modulator 135 can comprise a rectifying filter, a low pass filter, and a level detector, and is not limited to thereto.

The first power amplifier 137 amplifies a signal modulated by the first modulator 135 to a transmission level, and the amplified signal passes through the first coupler 143 and is transmitted through the transmission antenna 103.

The second modulator 139 modulates a digital transmission signal into a second analog signal. The second modulator 139 can modulate a signal using FSK or QPSK for example. The second modulator 139 can comprise a plurality of mixers, adders, and orthogonal signal conversion circuits. The second modulator 139 can change the phase of a transmission signal by 90° to convert a signal in the form in which four signals $I^+$, $I^-$, $Q^+$ and $Q^-$ are added.

Here, though the first modulator 135 exemplarily uses ASK modulation, and the second modulator 139 exemplarily uses QPSK modulation, the first modulator 135 and the second modulator 139 can use one of ASK, FSK, and QPSK modulations. The first and second modulators 135 and 139 can use the same modulation or a different modulation.

A signal modulated by the second modulator 139 is amplified by the second power amplifier 141, and the amplified signal is coupled to the first coupler 143 and transmitted through the transmission antenna 103. Here, elements on the transmission path using the first modulator 135 and the transmission path using the second modulator 139 can change depending on a transmission frequency. For example, the power amplifier on one of the paths can be removed.

The above-described first transmission module 130 can operate in the active mode and the passive mode by the power of the voltage generator 150 and the power unit 155. Also, the first transmission module 130 can be set to switch to the active mode when power is supplied through the power unit 155 with the passive mode set as a default. The setting of the passive mode and the active mode can change and is not limited thereto.

The transmission antenna 103 is connected to the first power amplifier 137 or the second power amplifier 141 through the first coupler 143.

The tag device 100 can comprise a reception antenna 101 and the transmission antenna 103, or transmit/receive signals using one antenna and a duplexer. There is no limitation in the structure and the number of the antennas.

Since the tag device 100 according to the first embodiment transmits signals modulated in various modulation methods, it can stably maintain communication according to an electromagnetic wave environment. Also, the tag device 100 can improve the signal recognition rate of the reader device, and improve reception sensitivity and signal recognition distance.

Figure 3:
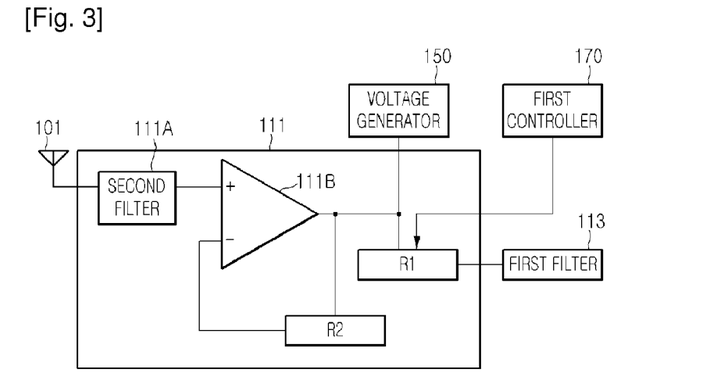
FIG. 3 is a construction view of the first signal processor of FIG. 2.

FIG. 3 is a construction view of the first signal processor of FIG. 2.

Referring to FIG. 3, the first signal processor 111 comprises a second filter 111A, a first log amplifier 111B, resistors R1 and R2. The second filter 111A is connected to the reception antenna 101. The positive terminal (+) of the first log amplifier 111B is connected to the second filter 111A, and the negative terminal (−) of the log amplifier 111B is connected to the second resistor R2 of a negative feedback circuit. The output terminal of the first log amplifier 111B is connected to the first filter 113 through the first resistor R1.

The second filter 111A filters signals in a predetermined frequency band from received signals of a mixed noise component. The first log amplifier 111B converts a signal output to the second filter 111A into a log scale. That is, the first log amplifier 111B converts a high frequency signal into a scale size to output a DC level analog signal, i.e., a baseband signal.

Also, the first log amplifier 111B can comprise at least one of a gain amplification circuit, a power amplification circuit, and a signal conversion circuit. The gain amplification circuit amplifies a signal according to a voltage gain to output an unstable high frequency signal in a state easy to recover. A reception signal whose gain has been amplified by the gain amplification circuit has a reduced bit error rate and has a high recognition rate even under a fading environment. Such a reception signal can be recovered to a stable signal even in a section where a reception level is about −90 dBm. The power amplification circuit secondarily amplifies and outputs the power of a signal whose gain has been amplified by the gain amplification circuit. The signal conversion circuit converts an RF signal amplified by the power amplification circuit, for example, a signal in a band of 900 MHz into a DC level analog signal proportional to a decibel value.

The amplification gain of the first log amplifier 111B can be controlled by the first resistor R1 and the second resistor R2. The second resistor R2 has fixed resistance, and the first resistor R1 is a variable resistor whose resistance is varied by the first controller 170. The second resistor R2 can be connected between the output terminal of the first log amplifier 111B and a connection point of the negative feedback circuit, or between the first resistor R1 and the first filter 113. Here, the first resistor R1 and the second resistor R2 connected to the first log amplifier 111B can serve as a gain control circuit of the first log amplifier 111B.

The amplification gain of the first log amplifier 111B can be controlled by math FIG. 1 below. For example, the amplification gain of the first log amplifier 111B is controlled within the range of about 0 dB-20 dB according to a numerical value of the first resistor R1.

MathFigure 1

$$\text{LOG AMP1\_Gain} = 1 + (R2/R1) \quad [\text{Math.1}]$$

Figure 4:
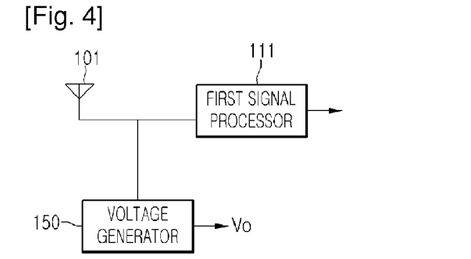
FIG. 4 is a construction view illustrating another example of the voltage generator of FIG. 2.

FIG. 4 is a view illustrating another example of the voltage generator according to the first embodiment.

Referring to FIG. 4, the voltage generator 150 can generate a voltage Vo using the electromagnetic energy of a high frequency signal received from the reception antenna 101. That is, the voltage generator 150 is a voltage oscillation circuit or a voltage multiplier circuit, and can be realized using a plurality of detection diodes and capacitors connected in multiple steps. The voltage generator 150 sequentially repeatedly rectifies an RF signal received through the reception antenna 101 into a DC voltage to increase the rectified DC voltage. The voltage generated by the voltage generator 150 is supplied to each part through a logic board.

Figure 5:
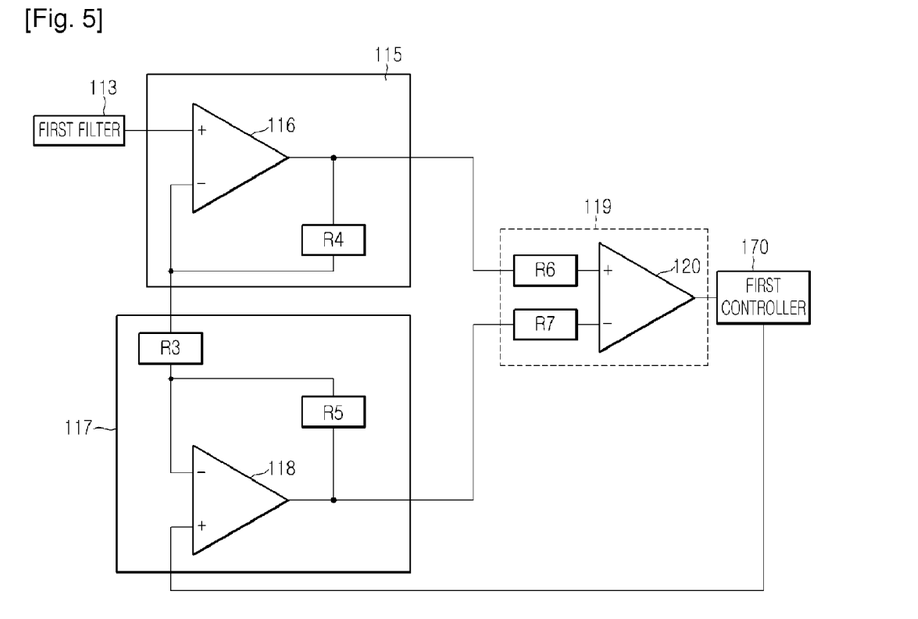
FIG. 5 is a construction view of the second to fourth signal processors of FIG. 2.

FIG. 5 is a construction view of the second to fourth signal processors of FIG. 2.

Referring to FIG. 5, the second signal processor 115 comprises a first operation amplifier 116 and a fourth resistor R4. The third signal processor 117 comprises a second operation amplifier 118, a fifth resistor R5, and a third resistor R3. The fourth signal processor 119 comprises a first comparator 120, a sixth resistor R6, and a seventh resistor R7.

The first filter 113 is connected to the positive terminal (+) of the first operation amplifier 116, and the fourth resistor R4 and the third resistor R3 of the negative feedback circuit are connected to the negative terminal (−) of the first operation amplifier 116 in parallel. A reference voltage of the first controller 170 is input to the positive terminal (+) of the second operation amplifier 118, and a fifth resistor R5 of the negative feedback circuit is connected to the negative terminal (−) of the second operation amplifier 118. The third resistor R3 is connected between the negative terminal (−) of the first operation amplifier 116 and the negative terminal (−) of the second operation amplifier 118. The output terminal of the first operation amplifier 116 is connected to the positive terminal (+) of the first comparator 120 through the sixth resistor R6, and connected to the fourth resistor R4 in parallel. The output terminal of the second operation amplifier 118 is connected to the negative terminal (−) of the first comparator 120 through the seventh resistor R7. The positive terminal (+) and negative terminal (−) of the first comparator 120 can be mutually changed and is not limited thereto.

The first operation amplifier 116 amplifies the gain of a signal that has passed through the first filter 113 to output the same. At this point, the gain is controlled by the fourth resistor R4 of a first feedback circuit of the first operation amplifier 116. The second operation amplifier 118 amplifies the reference voltage of the first controller 170 input to the positive terminal (+) of the second operation amplifier 118 to output the same. An output signal of the second operation amplifier 118 controls the level of a signal input to the negative terminal (−) of the first operation amplifier 116 through the fifth resistor R5 of a second feedback circuit, the third resistor R3, which is a feedback circuit, and the fourth resistor R4 of the first feedback circuit. Accordingly, the output signal of the second operation amplifier 118 changes according to the reference voltage of the first controller 170. The amplification gain of the first operation amplifier 116 is controlled by a change in the output signal of the second operation amplifier 118. That is, the amplification gains of the second operation amplifier 118 and the first operation amplifier 116 are controlled using the reference voltage of the first controller 170, so that the sensitivity of a reception signal output to the first operation amplifier 116 can be controlled.

Also, since the negative terminals (−) of the first operation amplifier 116 and the second operation amplifier 118 are connected to each other, the output signals of them can have an inverted phase. For example, a signal processed by the first and second operation amplifiers 116 and 118 is a DC level analog signal. When the output signal of the first operation amplifier 116 is a high level, the output signal of the second operation amplifier 118 becomes a low level.

The first comparator 120 of the fourth signal processor 119 compares the output signal of the first operation amplifier 116 with the output signal of the second operation amplifier 118, and outputs a digital signal to the first controller 170 according to the comparison result. Here, the first controller 170 can recover a digital signal more completely by delivering synchronization information to the fourth signal processor 119. Here, the digital signal of the fourth signal processor 119 is input to the first controller 170 as a transistor-transistor logic (TTL)/complementary metal oxide semiconductor (CMOS) signal.

Figure 6:
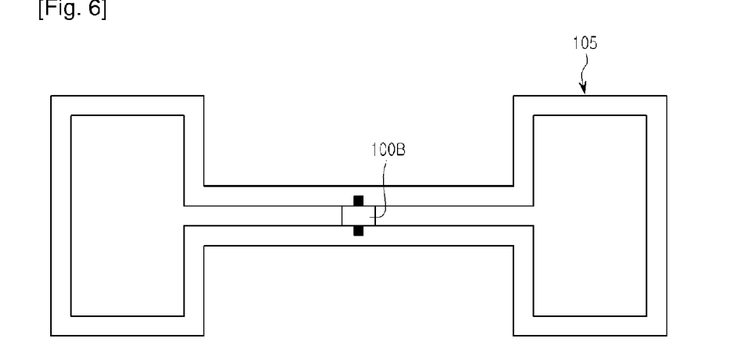
FIG. 6 is a view illustrating an example of an antenna of a tag device according to the first embodiment.

FIG. 6 is a view illustrating a modified example of an antenna of a tag device 100 according to the first embodiment.

Referring to FIG. 6, the tag device 100 comprises an IC chip 100B and a single antenna 105. The IC chip can comprise the first reception module 110, the first transmission module 130, the first controller 170, and the voltage generator 150 of FIG. 1. The antenna 105 is a transmission/reception antenna, and is formed in a closed loop type, for example, and has a structure in which the IC chip 100B has been mounted between two sides facing each other. The IC chip 100B can transmit or receive a signal through the antenna 105, there is no limitation in the structure of the antenna.

A second embodiment is described with reference to FIGS. 7 to 10.

Figure 7:
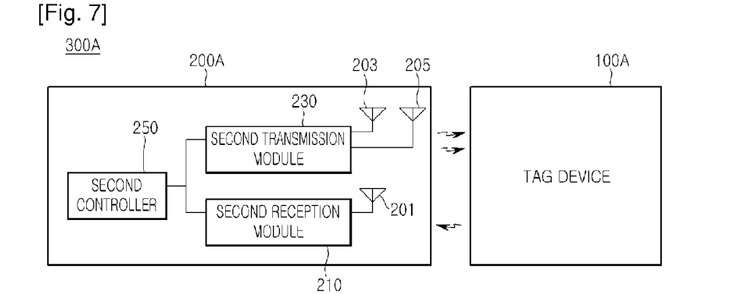
FIG. 7 is a construction view of an RFID system according to a second embodiment.

FIG. 7 is a construction view of an RFID system according to a second embodiment.

Referring to FIG. 7, the RFID system 300A comprises a tag device 100A and a reader device 200A. The reader device 200A communicates with the tag device 100A through wireless short distance communication in order to collect information of the tag device 100A. For example, the reader device 200A can collect data of the tag device 100A by transmitting an information request signal to the tag device 100A, and receiving object detailed information from the tag device 100A. The reader device 200A transmits/receives the collected information to/from a middle ware or other nodes.

The RFID system 300A performs communication through at least one RF frequency of an LF of 124-134 kHz, 13.56 MHz, 400-915 MHz, 2.45 GHz, and 5.8 GHz.

The tag device 100A can operate in at least one of a passive mode, an active mode, and a semi-active mode. The tag device 100A can operate in the semi-active mode, that is, in the passive mode and the active mode depending on whether power is supplied as in the tag device of the first embodiment.

The reader device 200A comprises a second reception module 210, a second transmission module 230, and a second controller 250. The second reception module 210 decodes a high frequency signal received through a reception antenna 201 into a digital signal. That is, the reader device 200A decodes a high frequency signal into a digital signal, not using general superheterodyne method, sequential low frequency method, intermediate frequency synthesis method. Accordingly, the circuit of the second reception module 210 can be minimized.

The second transmission module 230 modulates a digital transmission signal using different modulation methods, separates the modulated signal into an I signal and a Q signal, and transmits the signals through a plurality of transmission antennas 203 and 205. That is, the I signal is transmitted in the form of left hand circular polarization (LHCP) by the first transmission antenna 203, and the Q signal is transmitted in the form of right hand circular polarization (RHCP) by the second transmission antenna 205. Here, the transmission antennas 203 and 205 comprise a circularly polarization antenna.

Here, the second transmission module 230 can use at least two of ASK, FSK, and QPSK.

The reader device 200A can transmit a signal modulated in at least one modulation method in the form of the LHCP and the RHCP, or transmit a signal modulated in different modulation methods in the form of the LHCP and the RHCP. The modulated signal transmitted from the reader device 200A is received in the tag device 100A. At this point, since the tag device 100A can receive signals having various reception angles, a signal recognition rate can be improved in comparison with the case of receiving one signal.

The second controller 250 communicates with the tag device 100A through a communication protocol, controls the operations of the second reception module 210 and the second transmission module 230, transmits a periodic information request signal through the second transmission module 230, and stores and analyzes tag information received through the second reception module 210.

Figure 8:
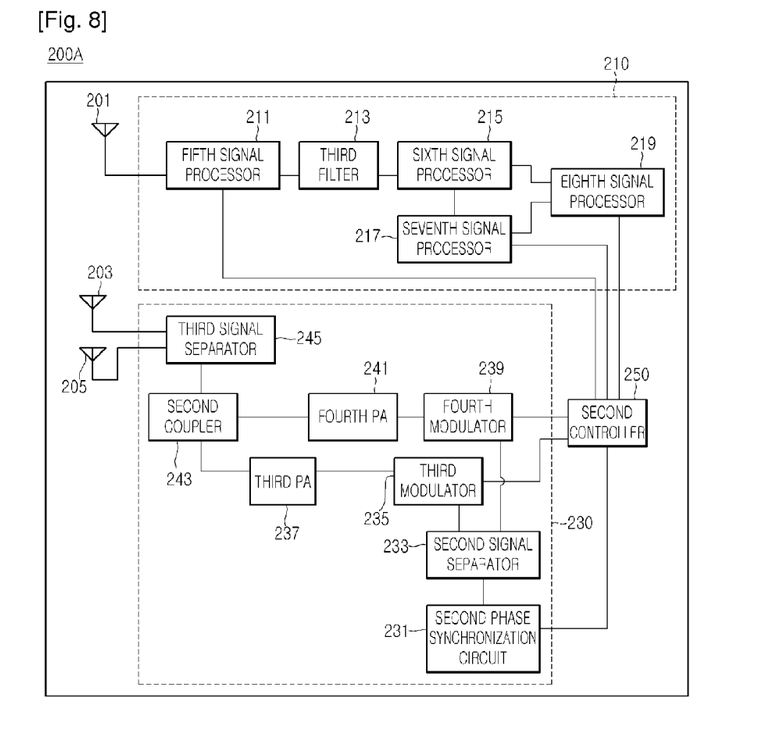
FIG. 8 is a construction view of the reader device of FIG. 7.

FIG. 8 is a construction view of the reader device of FIG. 7.

Referring to FIG. 8, the reader device 200 comprises the second reception module 210, the second transmission module 230, and the second controller 250. The second reception module 210 comprises a fifth signal processor 211, a third filter 213, a sixth signal processor 215, a seventh signal processor 217, and an eighth signal processor 219.

The fifth to eighth signal processors 211, 215, 217, and 219 decode a received high frequency signal into a digital signal. The fifth signal processor 211 filters RF signals in a predetermined frequency band from RF signals received through a reception antenna 201, gain-amplifies the signals, and processes the signals into DC-level analog signals. That is, a received high frequency signal is converted into a log scale by the fifth signal processor 211 and output as a baseband signal.

At this point, the second controller 250 outputs a control signal to the fifth signal processor 211, and the control signal controls the signal gain of the fifth signal processor 211.

The third filter 213 removes a noise component comprised in the signal processed by the fifth signal processor 211. The third filter 213 can be realized using passive devices such as a resistor and a capacitor to remove a ripple of a signal output from the fifth signal processor 211. That is, when a ripple is not sufficiently removed from a reception signal, a difference is generated to the scale of a carrier signal by a direct decoding method. Therefore, the third filter 213 removes the ripple of a reception signal.

The sixth signal processor 215 controls the gain of the output signal of the third filter 213 to amplify a signal, and the amplified signal is input to the eighth signal processor 219.

The output of the seventh signal processor 217 changes depending on the reference voltage of the second controller 250, and the changed output is input to the eighth signal processor 219. Here, since the output signal of the seventh signal processor 217 controls the amplification gain of the sixth signal processor 215, it compensates for the gain of a reception signal according to the various reference voltages of the second controller 250.

The eighth signal processor 219 compares the amplified signal of the sixth signal processor 215 with the output signal of the seventh signal processor 217 to output a digital signal as a comparison result. The digital signal of the eighth signal processor 219 is input to the second controller 250. At this point, the second controller 250 controls the gain of the fifth signal processor 211 and controls the reference voltage of the seventh signal processor 217 according to the state of a received signal. Accordingly, the second controller 250 can control the sensitivity of a digital signal output to the eighth signal processor 219. Also, the second controller 250 delivers synchronization information to the eighth signal processor 219 to control the comparison operation.

The second controller 250 collects and stores tag information from the tag device 100A. Also, the second controller 250 can analyze a reception signal decoded by the fifth to eighth signal processors 211, 215, 217, and 219, and communicate with an external interface or other nodes.

The second transmission module 230 comprises a second phase synchronization circuit 231, a second signal separator 233, a third modulator 235, a third power amplifier 237, a fourth modulator 239, a fourth power amplifier 241, a second coupler 243, and a third signal separator 245.

The second phase synchronization circuit 231 generates a reference signal to output the same to the second signal separator 233 in response to a control signal of the second controller 250. The second signal separator 233 outputs the reference signal to the third modulator 235 and the fourth modulator 239. Here, the second signal separator 233 can be realized using a switch device such as a single pole double throw (SPDT) or a coupler, but is not limited thereto.

At this point, the second controller 250 outputs a digital transmission signal, for example, a tag information request signal to the third modulator 235 and/or the fourth modulator 239 of the second transmission module 230. Also, the second controller 250 can send the tag information request signal to the third modulator 235 or the fourth modulator 239, or to the third modulator 235 and the fourth modulator 239 simultaneously, or to the third modulator 235 and the fourth modulator 239 sequentially.

The second controller 250 delivers the tag information request signal to the third modulator 235 and the fourth modulator 239 of the second reception module 230. The third modulator 235 modulates a digital transmission signal into a first analog signal using ASK, for example. The third modulator 235 can selectively comprise a rectifying filter, a low pass filter, and a level detector, and is not limited to thereto.

The third power amplifier 237 amplifies the first analog signal modulated by the third modulator 235 to a transmission level, and the amplified signal passes through the second coupler 243 and is delivered to the third signal separator 245.

The fourth modulator 239 modulates a digital transmission signal into a second analog signal. The fourth modulator 239 can modulate a signal using FSK or QPSK for example. The fourth modulator 239 can selectively comprise a plurality of mixers, adders, and orthogonal signal conversion circuits.

Here, though the third modulator 235 exemplarily uses ASK modulation, and the fourth modulator 239 exemplarily uses FSK or QPSK modulation, the third modulator 235 and the fourth modulator 239 can use one of ASK, FSK, and QPSK modulations. The third and fourth modulators 235 and 239 can use the same modulation or a different modulation. Also, elements on a transmission path using the third modulator 235 and a transmission path using the fourth modulator 239 can change depending on a transmission frequency. For example, the power amplifier on one of the paths can be removed, and there is no limitation.

A second analog signal modulated by the fourth modulator 239 is amplified by the fourth power amplifier 241, and the amplified second analog signal is coupled at the second coupler 243, and delivered to the third signal separator 245. The second coupler 243 can be connected to one of two input lines, and can couple and output signals input through the two lines. The location of the second coupler 243 can change, and can be comprised in the third signal separator 245 and is not limited thereto.

The second coupler 243 can output a first analog signal or a second analog signal, or couple the first analog signal and the second analog signal to output the same. That is, the form of an analog signal output to the second coupler 243 changes depending on whether the third modulator 235 and the fourth modulator 239 operate.

The third signal separator 245 can be realized in various circuits such as a circulator, a balloon circuit, a coupler, and polarization diversity, and can be realized using a branch line coupler having an excellent signal separation function or a balloon circuit, for example.

The third signal separator 245 separates an input first signal into and/or a second analog signal into two signals having a predetermined phase difference (ex: 90°). That is, the first analog signal is separated into a first I signal and a first Q signal. The second analog signal is separated into a second I signal and a second Q signal. Here, the I (In-phase) signal and the Q (Quadrature-phase) signal have a phase difference of 90° with respect to each other. For example, when the I signal has a phase of 0°, the Q signal has a phase of 90°.

A first I signal and/or a second I signal separated by the third signal separator 245 are transmitted through the first transmission antenna 203. A first Q signal and/or a second Q signal are transmitted through the second transmission antenna 205. Here, the first I signal and the second I signal, the first Q signal and the second Q signal are simultaneously transmitted, or only I/Q signals of one of analog signals can be transmitted, or I/Q signals of the analog signals can be sequentially transmitted.

The transmission antennas 203 and 205 comprise a plurality of circularly polarized antennas, and transmit different circularly polarized waves. For example, the first transmission antenna 203 transmits a first I signal and a second I signal in the form of LHCP, and the second transmission antenna 205 transmits a first Q signal and a second Q signal in the form of RHCP. The LHCP and the RHCP do not interfere with each other and form a bean pattern. The transmission antennas 203 and 205 can be formed in a dual type patch antenna.

The reader device 200A can transmit a signal modulated in at least one modulation method in the form of the LHCP and the RHCP, or transmit I and Q signals modulated in different methods in the form of the LHCP and the RHCP. A modulation signal transmitted from the reader device 200A is received in the tag device. At this point, since the tag device can receive signals having various reception angles, a signal recognition rate can be improved in comparison with the case of receiving one signal.

The reader device 200A according to the second embodiment can remove a phase change by movement of a tag device and remove recognition reduction by an energy delivery position. Also, the second embodiment improves a signal recognition distance, improves an energy supply to the tag device, and improves the reception sensitivity of the tag device by removing a reason why the intensity of a signal reduces as a distance between the reader device 200A and the tag device increases. The reader device can stably communicate with the tag device on the whole.

Figure 9:
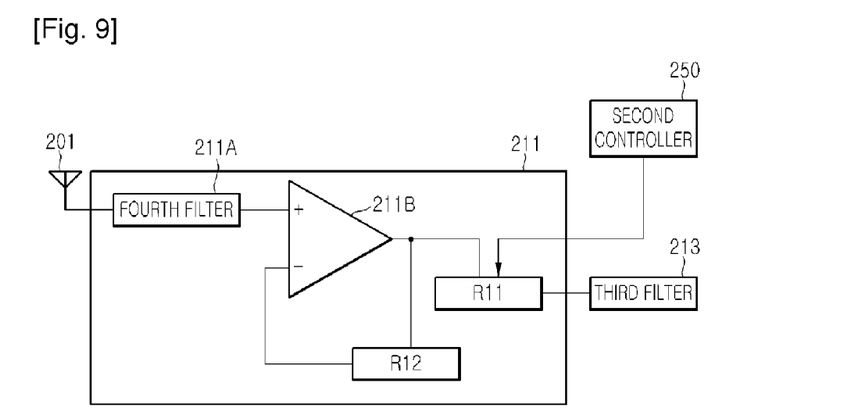
FIG. 9 is a construction view of the fifth signal processor of FIG. 8.

FIG. 9 is a construction view of the fifth signal processor of FIG. 8.

Referring to FIG. 9, the fifth signal processor 211 comprises a fourth filter 211A, a second log amplifier 211B, an eleventh resistor R11 and a twelfth resistor R2. The fourth filter 211A is connected to the reception antenna 201. The positive terminal (+) of the second log amplifier 211B is connected to the fourth filter 211A, and the negative terminal (−) of the log amplifier 211B is connected to the twelfth resistor R12 of a negative feedback circuit. The output terminal of the second log amplifier 211B is connected to the third filter 213 through the eleventh resistor R11.

The fourth filter 211A filters signals in a predetermined frequency band from received signals of a mixed noise component. The second log amplifier 211B converts a signal output to the fourth filter 211A into a log scale to output the signal into a DC level analog signal, i.e., a baseband signal.

The second log amplifier 211B can comprise at least one of a gain amplification circuit, a power amplification circuit, and a signal conversion circuit. The gain amplification circuit amplifies a signal according to a voltage gain to output an unstable high frequency signal in a state easy to recover. A reception signal whose gain has been amplified by the gain amplification circuit has a reduced bit error rate and has a high recognition rate even under a fading environment, so that such a reception signal can be recovered to a stable signal. The power amplification circuit secondarily amplifies and outputs the power of a signal whose gain has been amplified by the gain amplification circuit. The signal conversion circuit converts an RF signal amplified by the power amplification circuit, for example, a signal in a band of 900 MHz into a DC level analog signal proportional to a decibel value.

The amplification gain of the second log amplifier 211B can be controlled by the eleventh resistor R11 and the twelfth resistor R12. The twelfth resistor R12 has fixed resistance, and the eleventh resistor R11 is a variable resistor whose resistance is varied by the second controller 250. The twelfth resistor R12 can be connected between the output terminal of the second log amplifier 211B and a connection point of the negative feedback circuit, or between a connection point of the output terminal of the second log amplifier 211B and the negative feedback circuit, and the third filter 213. Here, the eleventh resistor R11 and the twelfth resistor R12 can serve as a gain control circuit of the second log amplifier 211B.

The amplification gain of the second log amplifier 211B can be controlled by math FIG. 2 below. For example, the amplification gain of the second log amplifier 211B is controlled within the range of about 0 dB-20 dB according to a numerical value of the eleventh resistor R11.

MathFigure 2

$$\text{LOG AMP 2\_Gain}=1+(R12/R11) \quad \text{[Math.2]}$$

Figure 10:
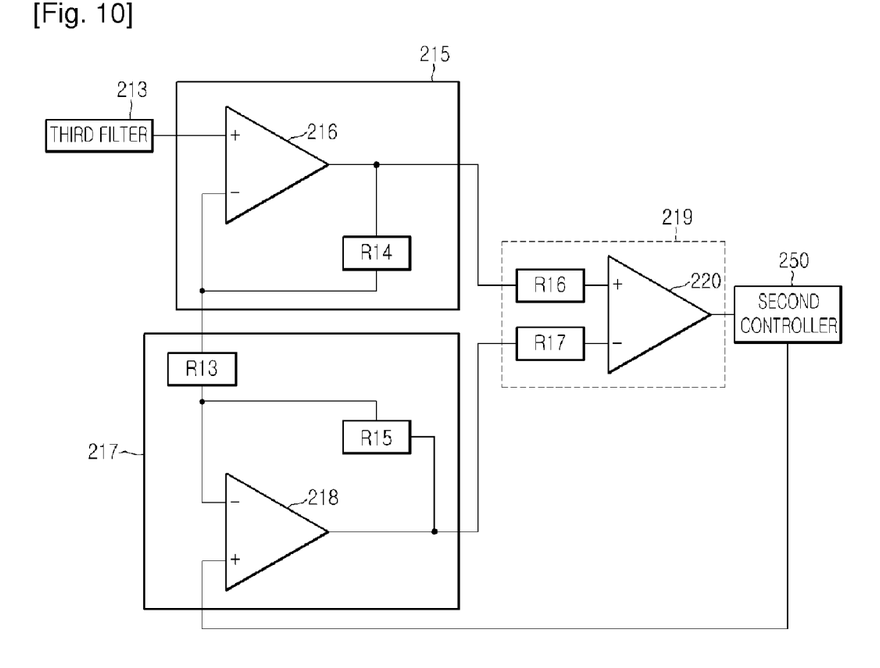
FIG. 10 is a construction view of the sixth to eighth signal processors of FIG. 8.

FIG. 10 is a construction view of the sixth to eighth signal processors of FIG. 8.

Referring to FIG. 10, the sixth signal processor 215 comprises a third operation amplifier 216 and a fourteenth resistor R14. The seventh signal processor 217 comprises a fourth operation amplifier 218, a fifteenth resistor R15, and a thirteenth resistor R13. The eighth signal processor 219 comprises a second comparator 220, a sixteenth resistor R16, and a seventeenth resistor R17.

The third filter 213 is connected to the positive terminal (+) of the third operation amplifier 216, and the fourteenth resistor R14 of a third feedback circuit is connected to the negative terminal (−) of the third operation amplifier 216. A reference voltage of the second controller 250 is input to the positive terminal (+) of the fourth operation amplifier 218, and the fifteenth resistor R15 of a fourth feedback circuit is connected to the negative terminal (−) of the fourth operation amplifier 218. The thirteenth resistor R13 is a feedback circuit, and is connected to the third feedback circuit of the third operation amplifier 216 and to the fourth feedback circuit of the fourth operation amplifier 218. The thirteen resistor R13 is disposed in parallel to the fourteenth resistor R14 and the fifteenth resistor R15. The output terminal of the third operation amplifier 216 is connected to the positive terminal (+) of the second comparator 220 through the sixteenth resistor R16, and the output terminal of the fourth operation amplifier 218 is connected to the negative terminal (−) of the second comparator 220 through the seventeenth resistor R17. The positive terminal (+) and negative terminal (−) of the second comparator 220 can be mutually changed and is not limited thereto.

The third operation amplifier 216 amplifies the gain of a signal that has passed through the third filter 213 to output the same. At this point, the gain is controlled by the fourteenth resistor R14 of the third feedback circuit of the third operation amplifier 216. The output level of the fourth operation amplifier 218 is controlled by the reference voltage of the second controller 250 input to the positive terminal (+) of the fourth operation amplifier 218. The output level of the fourth operation amplifier 218 controls the level of the negative terminal (−) of the third operation amplifier 216 through the fifteenth resistor R15, which is the fourth feedback circuit, the thirteenth resistor R13, which is a feedback circuit, and the fourteenth resistor R14, which is the third feedback circuit. Accordingly, the amplification gain of the output signal of the third operation amplifier 216 can be controlled according to the reference voltage of the second controller 250 input to the negative terminal (−) of the fourth operation amplifier 218. That is, the amplification gains of the fourth operation amplifier 218 and the third operation amplifier 216 are controlled using the reference voltage of the second controller 250, so that the sensitivity of a reception signal output to the third operation amplifier 216 can be controlled.

Also, since the negative terminals (−) of the third operation amplifier 216 and the fourth operation amplifier 218 are connected to each other through the thirteenth resistor R13, the output signals of them can have an inverted phase. For example, a signal processed by the third and fourth operation amplifiers 216 and 218 is a DC level analog signal. Therefore, when the output signal of the third operation amplifier 216 is a high level, the output signal of the fourth operation amplifier 218 becomes a low level.

The second comparator 220 of the eighth signal processor 219 compares the output signal of the third operation amplifier 216 with the output signal of the fourth operation amplifier 218, and outputs a digital signal to the second controller 250 according to the comparison result. Here, the second controller 250 can recover a digital signal more completely by delivering synchronization information to the eighth signal processor 219. That is, the digital signal of the eighth signal processor 219 is input to the second controller 250 as a TTL/CMOS signal.

According to the second embodiment, the reader device decodes a high frequency signal, and can improve the recognition rate of the tag device by transmitting signals in different modulation methods when modulating a tag request signal.

Meanwhile, in the embodiments, the tag device 100 of FIG. 1 described in the first embodiment can be applied as the tag device 100A of FIG. 7 described in the second embodiment, and the reader device 200A of FIG. 7 described in the second embodiment can be applied as the reader device 200 of FIG. 1 described in the first embodiment. The elements and the descriptions of the first embodiment, and the elements and the descriptions of the second embodiment are not limited to the relevant embodiment but can be applied to the other embodiment.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

Embodiments decode a received high frequency signal without using an intermediate frequency (IF), low IF, zero IF, so that the number of parts of tag device and the reader device is reduced, and thus the tag device and the reader device can be realized in a simple circuit.

Embodiments can efficiently use the power of the tag device.

Since embodiments provide various modulation methods to the tag device and/or the reader device, the system can stably maintain communication according to an electromagnetic wave environment.

Embodiments can improve the signal recognition rates of the tag device and the reader device, and improve reception sensitivity and signal recognition distance.

Embodiments can modulate transmission signals in various modulation methods, and transmit the signals in a circularly polarized component to provide the reader device that can stably communicate with the tag device.

The invention claimed is:

1. A tag device comprising:
 a reception module converting a received high frequency signal into a scale level, and converting the converted scale level into a digital signal to output the same;
 a transmission module modulating a transmission signal to output the same; and
 a controller controlling the reception module and the transmission module;
 wherein the reception module comprises a first signal processor converting the received high frequency signal into a log scale by using a log amplifier that receives a received signal through its positive terminal and converts the received signal into the scale level to output a DC level analog signal;
 a second signal processor amplifying a gain of the signal converted into the log scale by the first signal processor;
 a third signal processor controlling a signal level and a gain of the second signal processor under control of the controller; and
 a fourth signal processor changing an output signal of the second signal processor according to an output signal of the third signal processor to output the signal as a digital signal.

2. The tag device according to claim 1, wherein the first signal processor further comprises:
 a gain control circuit connected between an output terminal and a negative terminal of the log amplifier, and controlling an amplification gain of the log amplifier using resistance varied by the controller.

3. The tag device according to claim 1, wherein the second signal processor comprises:
 a first operation amplifier amplifying an output signal of the first signal processor and outputting the same; and
 a first feedback circuit connected between an output terminal and a negative terminal of the first operation amplifier, and
 the third signal processor comprises:
 a second operation amplifier amplifying a reference voltage of the controller and outputting the same;
 a second feedback circuit connected between an output terminal and a negative terminal of the second operation amplifier; and
 a feedback circuit feeding back a signal of the second feedback circuit to the first feedback circuit.

4. The tag device according to claim 1, wherein the fourth signal processor comprises a comparator comparing an output signal of the second signal processor with an output signal of the third signal processor to output a digital signal to the controller.

5. The tag device according to claim 1, comprising a voltage generator receiving an output of the log amplifier to generate a voltage, and supplying the voltage to each element through the controller.

6. The tag device according to claim 1, comprising a first filter removing a noise of the signal converted into the log scale by the first signal processor.

7. The tag device according to claim 1, wherein the first signal processor further comprises a second filter passing signals in a predetermined band from received signals.

8. The tag device according to claim 1, wherein the transmission module comprises:
 a first modulator modulating the transmission signal;
 a first amplifier amplifying the signal modulated by the first modulator;
 a second modulator modulating the transmission signal;
 a second amplifier amplifying the signal modulated by the second modulator; and
 a coupler outputting at least one of signals amplified by the first amplifier and the second amplifier to an antenna.

9. The tag device according to claim 8, wherein the first modulator comprises an amplitude shift keying modulation method, and the second modulator comprises one of a frequency shift keying modulation method and a quadrature phase shift keying modulation method.

10. The tag device according to claim 1, wherein the controller controls an operation in one of a passive mode and an active mode depending on whether battery power is supplied, and selects a different modulation method depending on each mode.

11. A reader device comprising:
 a reception module converting a received high frequency signal into a scale level, and outputting the converted scale level reception signal as a digital signal;
 a transmission module modulating an information request signal to output the same; and
 a controller controlling the reception module and the transmission module;
 wherein the reception module comprises:
 a first signal processor converting the received high frequency signal into a log scale by using a log amplifier that receives a received signal through its positive terminal and converts the received signal into the scale level to output a DC level analog signal;
 a second signal processor amplifying a gain of the signal converted into the log scale by the first signal processor;
 a third signal processor controlling a signal level and a gain of the second signal processor under control of the controller; and
 a fourth signal processor changing an output signal of the second signal processor according to an output signal of the third signal processor to output the signal as a digital signal.

12. The reader device according to claim 11, wherein the first signal processor further comprises:
 a gain control circuit connected between an output terminal and a negative terminal of the log amplifier, and controlling an amplification gain of the log amplifier using resistance varied by the controller.

13. The reader device according to claim 11, wherein the transmission module comprises:
 a first modulator modulating the information request signal;

a second modulator modulating the information request signal;

a coupler outputting at least one of signals amplified by the first modulator and the second modulator; and a signal separator separating output signals of the coupler into a signal of the same phase and an orthogonal signal, and transmitting the signal through an antenna.

14. The reader device according to claim 13, wherein the signal of the same phase separated by the signal separator of the transmission module is transmitted through a first transmission antenna, and the orthogonal signal is transmitted through a second transmission antenna, and the first and second transmission antennas comprise a circular polarized antenna.

15. The reader device according to claim 13, wherein the first modulator comprises an amplitude shift keying modulation method, and the second modulator comprises one of a frequency shift keying modulation method and a quadrature phase shift keying modulation method.

16. A radio frequency identification system comprising:
a tag device comprising:
a first reception module converting a received high frequency signal into a scale level, and outputting the converted scale level reception signal as a digital signal;
a first transmission module modulating an information request signal to output the same; and
a first controller controlling the first reception module and the first transmission module, and
a reader device comprising:
a second reception module converting a high frequency signal received from the tag device into a scale level, and outputting the converted scale level reception signal as a digital signal;
a second transmission module modulating an information request signal, and transmitting the signal to the tag device; and
a second controller controlling the second reception module and the second transmission module,
wherein the first reception module or second reception module comprises:

a first signal processor converting the received high frequency signal into a log scale by using a log amplifier that receives a received signal through its positive terminal and converts the received signal into the scale level to output a DC level analog signal;

a second signal processor amplifying a gain of the signal converted into the log scale by the first signal processor;

a third signal processor controlling a signal level and a gain of the second signal processor under control of the controller; and a fourth signal processor changing an output signal of the second signal processor according to an output signal of the third signal processor to output the signal as a digital signal.

17. The radio frequency identification system according to claim 16, wherein the first transmission module comprises:
a first modulator modulating the transmission signal;
a first amplifier amplifying the signal modulated by the first modulator;
a second modulator modulating the transmission signal;
a second amplifier amplifying the signal modulated by the second modulator; and
a first coupler outputting at least one of signals amplified by the first amplifier and the second amplifier to an antenna.

18. The radio frequency identification system according to claim 16, wherein the second transmission module comprises:
a first modulator modulating the information request signal;
a first amplifier amplifying the signal modulated by the first modulator;
a second modulator modulating the information request signal;
a second amplifier amplifying the signal modulated by the second modulator;
a second coupler outputting at least one of signals amplified by the first amplifier and the second amplifier; and
a signal separator separating output signals of the coupler into a signal of the same phase and an orthogonal signal, and transmitting the signal through each polarization antenna.

* * * * *